United States Patent
Petro

(10) Patent No.: US 6,501,357 B2
(45) Date of Patent: Dec. 31, 2002

(54) PERMANENT MAGNET ACTUATOR MECHANISM

(75) Inventor: John Petro, Los Altos, CA (US)

(73) Assignee: Quizix, Inc., North Highlands, CA (US)

( * ) Notice: Subject to any disclaimer, the term of this patent is extended or adjusted under 35 U.S.C. 154(b) by 0 days.

(21) Appl. No.: 09/802,423

(22) Filed: Mar. 9, 2001

(65) Prior Publication Data

US 2001/0026204 A1 Oct. 4, 2001

Related U.S. Application Data

(60) Provisional application No. 60/189,943, filed on Mar. 16, 2000.

(51) Int. Cl.⁷ ................................................ H01F 7/00
(52) U.S. Cl. ......................... 335/229; 335/234; 310/17
(58) Field of Search ................................ 335/220, 229, 335/230, 234, 256, 266, 268; 251/129.01–129.21; 310/12, 13, 14, 15, 17

(56) References Cited

U.S. PATENT DOCUMENTS

| | | |
|---|---|---|
| 4,072,370 A | 2/1978 | Wasson |
| 4,253,493 A | 3/1981 | English |
| 4,327,638 A | 5/1982 | Wassermann |
| 4,533,890 A | 8/1985 | Patel |
| 4,692,673 A * | 9/1987 | DeLong ........................ 310/30 |
| 4,829,947 A | 5/1989 | Lequesne |
| 4,831,973 A | 5/1989 | Richeson, Jr. |
| 4,928,028 A | 5/1990 | Leibovich |
| 5,012,144 A * | 4/1991 | Huitema et al. ............ 335/234 |
| 5,166,652 A | 11/1992 | Koyama et al. |
| 5,434,549 A | 7/1995 | Hirabayashi et al. |
| 5,444,313 A | 8/1995 | Oudet |
| 5,814,907 A * | 9/1998 | Bandera ....................... 310/17 |
| 5,896,076 A | 4/1999 | van Namen |
| 6,028,499 A | 2/2000 | Oudet et al. |
| 6,040,752 A | 3/2000 | Fisher |
| 6,084,320 A * | 7/2000 | Morita et al. ................. 310/12 |
| 6,147,422 A | 11/2000 | Delson et al. |
| 6,166,465 A | 12/2000 | Fujita et al. |

FOREIGN PATENT DOCUMENTS

| | | |
|---|---|---|
| GB | 2349746 A | 8/2000 |
| JP | 01-190254 | 7/1989 |
| JP | 06-038486 | 2/1994 |

\* cited by examiner

*Primary Examiner*—Lincoln Donovan
(74) *Attorney, Agent, or Firm*—Richard Esty Peterson

(57) ABSTRACT

A permanent magnet, bistable actuator mechanism that uses magnetic repulsion for actuation, the actuator mechanism having a first translator member with a permanent magnet element displaceable between a first position and a second position and a second translator member having a permanent magnet element displaceable between a first position and a second position with the permanent magnet elements in mutual repulsion, the translator elements being arranged in a frame or containment structure that limits displacements of the first and second translator members with one of the translator members being a master member and the other being a slave member, such that displacement of the master member from one position to the other displaces the slave member in an opposite direction with the displacement process being reversible.

26 Claims, 11 Drawing Sheets

FORCE VS. DISPLACEMENT WITHOUT SPRINGS

SPRING FORCES VS. DISPLACEMENT

RESULTANT FORCES VS. DISPLACEMENT

701

701

PERMANENT MAGNET ACTUATOR MECHANISM

CROSS REFERENCE TO RELATED APPLICATIONS

This application is based on Provisional Application Serial No. 60/189,943 entitled Bistable Actuator, filed Mar. 16, 2000, which is herein incorporated by reference.

BACKGROUND OF THE INVENTION

This invention relates to an actuator device. In particular, the actuator device of this invention is a permanent magnet actuator mechanism. In operation, a first permanent magnet member co-acts with a second permanent magnet member in a master/slave relationship. The permanent magnet members are positioned with the magnet members in mutual magnetic repulsion wherein displacement of one of the permanent magnet members automatically effects opposite displacement of the other of the permanent magnet members.

The use of permanent magnet members in mutual repulsion has heretofore generally been avoided because of the problems with demagnetization of the magnets. However, with the discovery of new powerful magnetic materials that resist demagnetization, novel actuator mechanisms with permanent magnets in mutual repulsion may now be devised.

In many mechanical and electro-mechanical systems it is desirable to displace one element by displacement of another element without direct contact of the displaced element by the displacing element. For example, displacement of a valve spool in a fluid conduit by a displacement of an actuating element, external to the conduit has advantages when the external element is not physically connected to the valve spool. The elimination of seals, valve stems and other components commonly employed in valve assemblies of the poppet type, avoids the potential for leaking and/or contaminating the fluid in the conduit.

It is a principal object of this invention to effect the translocation of one element by the translocation of a controlled element using magnetic repulsion.

It is an additional object of this invention to accomplish the translocation of the target element by actuation of the controlled element without the controlled element directly contacting the target element.

It is a further object of this invention to allow translocation of the target element even where there is a barrier separating the translocated element from the controlled element.

It is an important object of this invention in many applications to provide a reversible translocation of the target or slave element by a reversible translocation of the controlled or master element.

As an additional object, in the reversible translocations of the master and slave elements, the elements adopt a fixed state wherein a bistable actuator is formed. In the reversible fixed states of the master and slave elements no energy is required to maintain the elements in their switchable fixed states.

The invented permanent magnet actuating mechanism includes permanent magnet members acting in mutual repulsion which effect relative opposite displacements of the magnet members when actuation of one member is initiated by an external force. The translocation of the magnet members enables the magnet actuating device to function as a switching device, in particular, a bistable switching device. In other applications the magnet actuating mechanism operates as a reciprocal displacement device wherein displacement of one magnet member in one direction effects displacement of the other magnet member in the opposite direction.

The relative displacement of the magnet members, enables the permanent magnet actuating mechanism to have application in a variety of devices in addition to the valving and switching devices mentioned. These applications include, but are not limited to, piston mechanisms, vibrators, clamping devices and other systems where reciprocal displacements and reversible translocations are desired.

In view of the objects of this invention and the attributes of the mechanism for implementation, one skilled in the art will be able to modify the structure and tailor the parameters of operation to suit a variety of applications of the type suggested.

SUMMARY OF THE INVENTION

The permanent magnet actuator mechanism of this invention comprises an assembly of two permanent magnet members in a framework or containment structure that maintains and limits the relative positioning of the magnet members during displacements. Each of the permanent magnet members in the simplest embodiment comprises a single permanent magnet element. The two permanent magnet elements are positioned in the framework for limited reciprocal displacements and are juxtaposed with magnetic fields in mutual repulsion.

One of the permanent magnet elements is the master element and is arranged in the framework for a relative displacement greater than the other element, which becomes the slave element. The displacement of the master element from one of its limit positions to the other, abruptly causes the opposite displacement of the slave element from one limit position to the other. The master element and the slave element are then each held in the switched position by the mutual repulsion forces of the magnet elements.

In the preferred embodiments described, the magnet members are each an assembly of magnet elements and pole elements that are arranged to optimize one or more selected variables of operation for the application desired. In addition, the permanent magnet actuator mechanism in one embodiment includes spring elements associated with the master permanent magnet member for modifying the forces required to move the master magnet member over the distance of displacement.

It is to be understood that in a permanent magnet actuator mechanism without springs or other attenuating means, the typical force curve for a symmetrical system is approximately sinusoidal. The forced displacement of the master magnet member initially meets peak resistance, which drops to zero at a neutral position in between the terminal positions of the master magnet member, and at this point the slave member automatically switches position, becomes negative, being force driven to the opposite position by the repulsion of the shifted slave member. By appropriate selection and engagement of compression springs, for example, this otherwise lost energy of the displacing master magnet member can be captured as potential energy in the compressed spring element for use in the next translocation of the master member.

The strategic use of springs or other means for assisting actuation, for example, fluid pressure, provides an additional controllable variable in the application of the permanent magnet actuator for different uses. For example, the force curve can be flattened so a small but uniform force applied to the master magnet member throughout the period of displacement effects the shift of the slave magnet member, which is held in its shifted position by a magnetic force of repulsion that may be many magnitudes greater than the external displacement force applied to the master member.

Disclosed in this specification as one useful embodiment is a bistable actuator constructed with two or more coaxial permanent magnets magnetized in the axial direction and spaced so that their magnetic fields are in opposition to one another. The internal magnet, which may be a disc magnet, is free to move axially within limits established by a housing. The internal magnetic provides the output force of the actuator and will normally have one or more rods attached to it which exit the housing. The external magnet, which is preferably a ring magnet, is free to move axially along the outside of the housing. The housing also provides mechanical stops for the external magnets, however, the external magnets are allowed to move further than the internal magnet by an amount that is established by the thickness of the magnet and the range of motion of the internal magnet.

Because the magnetic fields in a typical arrangement are placed so that the north and south poles of the two magnets are oriented in the same direction, the opposing fields will push the internal magnet to one end of its travel while the external magnet will be pushed to the mechanical stop at the other end. This opposing magnetic force is the force that is available from this actuator. To cause the actuator to switch to the other bistable state, a force is applied to the external ring magnets that moves these magnets axially towards the internal magnets which are kept from moving away by their mechanical stop. When the magnetic centerline of the external magnets passes the magnetic centerline of the internal magnets, the internal magnets then experience a force that pushes them in the opposite direction. The internal magnets then move to the other limit of the travel and the external magnets will continue moving in the same direction to the mechanical stop away from the internal magnets. Force is now generated in the opposite direction from before switching.

The driving force for moving the external magnets (and causing the actuator to switch states) can be obtained by many different ways including manual operation, with electric coils or motors, or, by pneumatics or hydraulics. The use of electric coils is a particularly desirable activation method because of the simple direct electrical control that this allows for automatic operations. However, electric coils do not generate as high forces as are available from high strength rare earth magnets. To solve this problem springs can be added to one or both ends of travel of the external magnets. These springs can absorb energy while the mechanism is closing and this energy can be extracted when the mechanism switches back to the original position. The spring energy directly reduces the required activation force allowing high force actuators, while still using small coils which are not ordinarily capable of developing such high forces. The springs also provide a shock absorber function for the switching movement of the external magnets.

Several advantages of this mechanism should be pointed out. First, it is a naturally bistable mechanism which requires no power to generate actuator force. Operation by electric coils is particularly advantageous since the coils can be pulsed to switch states of the bistable actuator mechanism. Power is consumed only during switching operations. No energy is required to maintain the mechanism in either of the switched states. Second, in axial or symmetrical systems the internal magnets are naturally self centering since they are arranged in opposition to the external magnets. Third, the internal actuator can be easily isolated from the external switch mechanism by the housing wall. This is particularly well suited for a positively actuated valve. Fourth, almost any desired force can be generated by either making the magnets bigger in diameter or by increasing length by stacking multiple magnets together in alternating north-south/south-north assemblies or by both means.

Multiple stacks of magnets can use magnetic focusing techniques using iron or radially polarized magnets to increase the coupling strength between the internal and external magnets. Magnet dimensions for maximum coupling force can be calculated for any desired mechanical geometry and magnetic materials. Fifth, by proper spring sizing very little force is needed to get this actuator to switch from one state to the other. Sixth, the actuator can be made to go normally open or normally closed when the power fails by choosing appropriate springs and using activated coil force to hold the external magnets in one position or other. Seventh, the design is naturally compact and easy to construct. The only expensive components are the magnets. Eighth, the visual position of the ring magnets provides a clear indication of switching state of the actuator. This position can be detected by an electronic circuit and reported back to a control mechanism. Ninth, the switching action can be made to happen fast. Tenth, the length of travel of the actuator can be set by choosing the magnet thickness.

A positively driven valve is constructed by using this actuator which can generate a force inside a housing, it creates a valve without the need for a dynamic stem seal as is required by most solenoid valve designs. Eliminating the stem seal eliminates the main leak path of most valves. The valve is a constant volume valve since no volume changes occur with switching. This means that the pressure spikes most valves generate when switching are eliminated. Since the actuator only needs power when it is switching this also eliminates the heating normally generated by solenoid valves. Since such high forces can be generated, valves can be made that go to higher pressure or have bigger flow paths. Valves using this actuator can easily be constructed as a normally open or a normally closed valve with appropriate spring selection. Also, a three way valve which goes from ON-OFF to OFF-ON while passing through the ON-ON state is easily made at very little additional cost over a simple two way ON and OFF valve by putting a flow control element and fluid port on each end of the internal magnetic actuator.

DETAILED DESCRIPTION OF THE PREFERRED EMBODIMENTS

Figure 1:
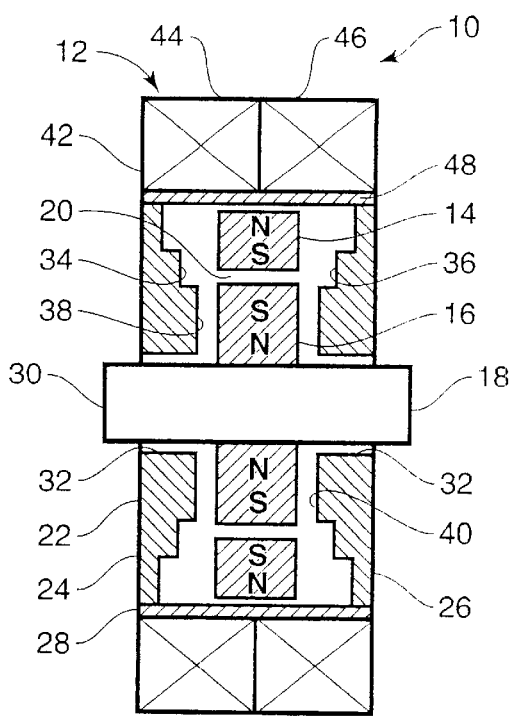
FIG. 1 is a cross-sectional view of a first embodiment of the actuator mechanism of this invention.

The actuator device of this invention is in the general embodiment of a permanent magnet actuator mechanism which is designated by the reference numeral 10, and shown in various embodiments in the drawings. In FIGS. 1–4, embodiments of the permanent magnet actuator mechanism 10 are shown in their simplest form for purposes of schematically illustrating the basic modes of operation. It is to be understood that a mechanism with only two magnets is inefficient and mechanisms with magnet elements in the format magnet assemblies are preferred.

Referring to FIG. 1, a simple form dual magnet actuator unit 12 is shown in a first embodiment. The dual magnet actuator unit 12 includes a first magnet member 14 in the form of a single annular permanent magnet and a second magnet member 16, also in the form of an annular permanent magnet arranged on a common axis 18 as shown. The first and second magnet members have a magnetic polarity as indicated wherein the magnets are in mutual repulsion. The first magnet member 14 and the second magnet member 16 are separated by an air gap 20 and are contained within a framework 22 in the form of a housing. The framework 22 has circular end plates 24 and 26 interconnected by a cylindrical sleeve 28. The cylindrical sleeve 28 and end plates 24 and 26 are fabricated from a non-magnetic material that does not interfere significantly with the magnetic properties of the two magnetic members 14 and 16. The permanent magnet member 16 is fixed to a cylindrical pin 30 slideably mounted in a center hole 32 in each of the end plates 24 and 26.

In the embodiment of FIG. 1, the second magnet member and first magnet member are shown in a center alignment for purposes of illustration only. This is an unstable condition, since the common poles across the air gap 20 result in repulsion and tend to drive the first magnet member 14 and the second magnet member 16 in opposite directions. Furthermore, the displacements of the magnet members are exaggerated for clarity.

The displacement of the first magnet member 14 is limited by opposite stops 34 and 36. The stops 34 and 36 are formed by stepped, annular ridges on the inside of the end plates 24 and 26. In the dual magnet actuator unit 12 of FIG. 1, the travel or "stroke" of the first magnet member 14, between stops 34 and 36, is greater than the travel or "stroke" of the second magnet member 16 between stops 38 and 40. In this embodiment the first magnet member 14 is the master member and the second magnet member is the slave member. Upon movement of the first master member 14 from one stop to the other, for example, from stop 34 to stop 36 the second slave member 16 will automatically be driven in the opposite direction to the stop 38.

It is to be understood that the inner or second magnet member can be the master member by altering the configuration of the stops so that the travel or "stroke" of the second magnet member 16' is greater than the first magnet member 14' as shown in an alternate configuration of the dual magnet actuator unit of FIG. 2, described in greater detail hereinafter.

In order to displace the master magnet member to effect automatic displacement of the slave magnet member, an external, prime mover must be added. This can be electromagnetic, as shown in FIG. 1, mechanical, as shown in FIG. 2, or some other external means.

Figure 3:
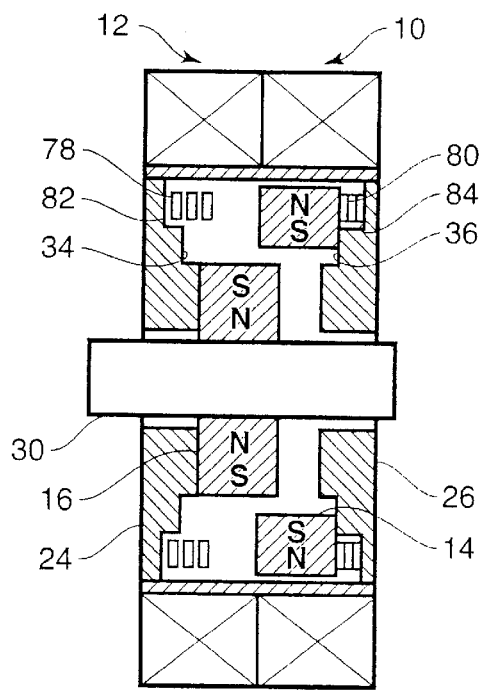
FIG. 3 is a cross-sectional view of the actuator mechanism of FIG. 1 including springs and showing a first stable position of the actuator elements.
Figure 4:
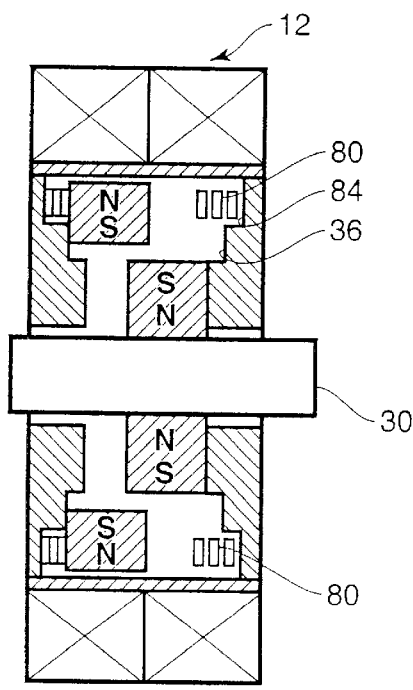
FIG. 4 is a cross-sectional view of the actuator mechanism of FIG. 3 showing a second stable position of the actuator elements.

In the dual magnet actuator unit 12 of FIG. 1, the external means for moving the first magnet member 14 relative to the second magnet member 16 comprises an electromagnetic driver 42 with first and second electronic coils 44 and 46 having windings that are configured to generate an electromagnetic field that acts in opposition to the field of the first magnet member 14. When selectively activated, the coils 44 and 46 generate an electromagnetic field across a gap 48 formed largely by the thickness of the cylindrical sleeve 28. The cylindrical sleeve 28, at least in the embodiment of FIG. 1 using an electromagnetic driver, is formed of a material that minimally interferes with the magnetic fields of the activated electronic coil and the first magnet member 14. Each coil 44 or 46 is designed to generate a sufficiently strong electromagnetic field to overcome the repulsive forces of the first magnet member 14 and the second magnet member 16 and drive the first magnet member to the opposite stop. In this respect, the coils 44 and 46 are offset slightly to the position of the first magnet member when resting against its stop 34. The offset provides a resulting force vector parallel to the common axis 18 of the magnet members 14 and 16. In the simplest operation the coil that is proximate the first magnet member when seated against a particular stop is activated. Many other simple and complex coil arrangements can be devised. Referring briefly to FIGS. 3 and 4, the opposite stable positionings of the first magnet member 14 and the second magnet member 16 are shown.

Figure 2:
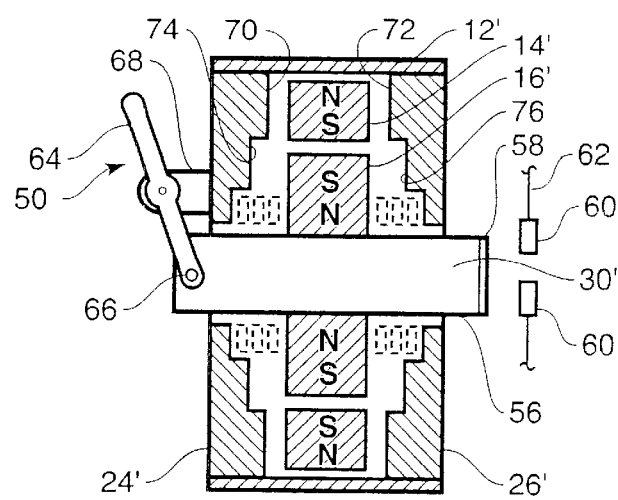
FIG. 2 is a cross-sectional view of a second embodiment of the actuator mechanism.

Referring to the alternate dual magnet actuator unit 12' of FIG. 2, the external prime mover is in the form of a mechanical driver 50. The mechanical driver applies a force to the pin 30' on the second magnet member 16'. When the pin 30' and the connected magnet member 16' are shifted from one side to the other, the repelling magnetic fields cause the other magnet member 14' to correspondingly shift to the opposite position. The mechanical unit of FIG. 2 has application as a bistable throw switch. It is preferred that the pin 30' be constructed from a non-magnetic material.

In the alternate embodiment of FIG. 2, the pin 30' has a first end 56 with an electrically conductive contact 58 that, on displacement of the pin 30' in one direction, moves into contact with a pair of spaced terminal contacts 60 completing a circuit 62 (shown in part). In this example of an application for the simple mechanical unit 12' the pin 30' is displaced by a manual switch lever 64 pivotally connected to the pin 30' by a cross pin 66 and to the end plate 24' by a pivot bracket 68.

When the pin 30' is displaced by the switch lever 64 toward the terminal contacts 60 a short distance beyond the position shown in FIG. 2, the first magnet member 14' immediately shifts in the opposite direction driving the second magnet member 16' toward the contacts 60 and completing the circuit across the terminal contacts 60.

It is to be understood that the symmetrical, neutral position of the first and second magnet members 14' and 16' is for purposes of illustration only, since the first slave member 14' must be displaced from one of its two stable positions against stop 70 or stop 72. The second master magnet member 16' has its stable position against one of the two stops 74 and 76 which are spaced apart a distance greater than the distance between stops 70 and 72.

Referring now to FIGS. 3 and 4, the permanent magnet actuator mechanism 10 in the form of the dual magnet actuator unit 12 of FIG. 1 is constructed identically to the embodiment of FIG. 1 with the addition of two circumferential coil springs 78 and 80. The coil springs 78 and 80 are located in respective coil seats 82 and 84 recessed into the end plates 24 and 26. In one optimized design it is desired that the magnetic repulsive forces of the first magnet member 14 and the second magnet member 16 be greatest when the magnet members 14 and 16 are oppositely positioned against their respective stops. Therefore, without the addition of compression springs, the force required to displace the first master magnet member from one position to the other is greatest at the initiation of displacement and diminishes as the magnets align at their unstable neutral position and thereafter becomes a negative force until the respective magnets are again seated against their respective opposite stops.

This force curve is approximately a half cycle sinusoid. By appropriate selection of a compression spring, the force/distance slope of a compression spring can approximately match the force distance slope of the magnets during translocation. In essence, the potential energy stored by the compression spring as it is compressed by the master magnet member in its magnetically forced travel to its stop can be recovered to assist displacement of the master magnet member during its reciprocal displacement to the opposite stop. In this manner, the force/displacement curve can be flattened such that the prime mover supplies a substantially lower force of flattened profile throughout the stroke of the master magnet member from one stable position to the other.

It is to be understood that the embodiments of FIGS. 1–4 are for purposes of illustration and simple demonstration of the principles involved herein. As noted, utility and efficiency of the device is limited by the use of single magnets in the first and second magnet members.

Figure 5:
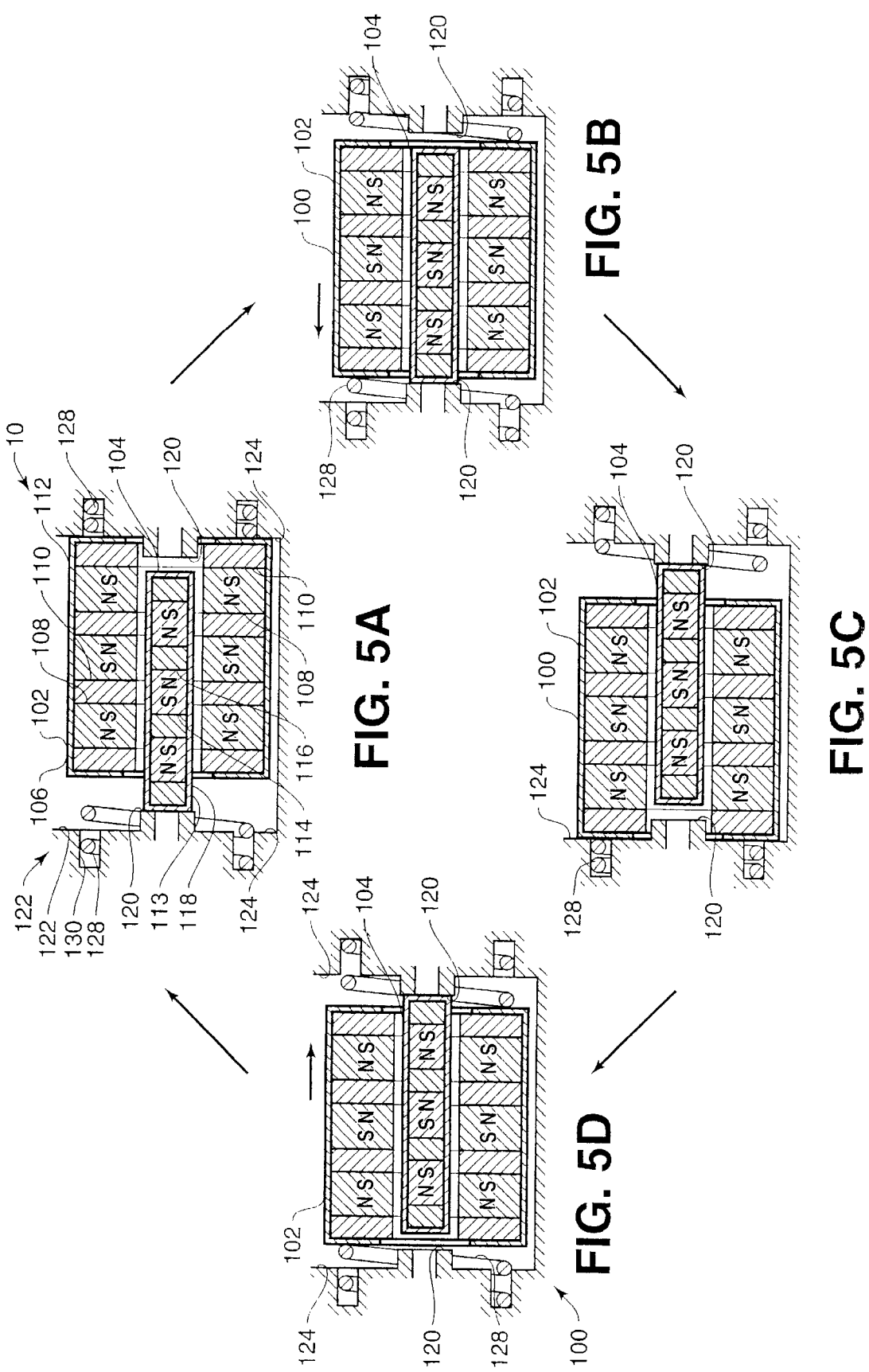
FIGS. 5A–5D depict a third embodiment of the actuator mechanism in a staged cycle of operation.

The cycle of a symmetrical, bistable permanent magnet actuator mechanism 10 is illustrated in FIGS. 5A–5D. The permanent magnet actuator mechanism 10 is representative of a typical multiple magnet actuator mechanism designated generally by the reference numeral 100. As shown in FIG. 5A, the multiple magnet actuator mechanism 100 includes a first magnet member 102 and a second magnet member 104.

The first magnet member 102 is formed by a multiple magnet assembly 106 having three permanent ring magnets 108 separated and bracketed by four ring pole pieces 110 contained within a casing 112. The first magnet member 102 is annular in form and encompasses the second magnet member 104. The second magnet member 104 is formed by a multiple magnet assembly 113 constructed with three permanent disk magnets 114 separated and bracketed by four disk pole pieces 116 contained within a casing 118.

In the embodiment of FIG. 5A, the first magnet member 102 comprises the master or actuating member which on displacement will cause the resultant opposite displacement of the second magnet member 104 as the slave or actuated member. The second magnet member 104 is displaceable between opposite stops 120 formed in a containment structure 122. Similarly, the first magnet member 102 is displaceable between opposite stops 124 in the containment structure 122. In configurations of the permanent magnet actuator mechanism that utilize axial symmetry, the magnetic fields of repulsion arising from the typical magnet positioning and pole arrangement of the multiple ring magnet assembly 106 and multiple cylindrical magnet assembly 113 will result in the second magnet member 104 maintaining a concentric floating position within the annulus of the first magnet member 102.

In the embodiment shown in FIGS. 5A–5D, the permanent magnet actuator mechanism 100 includes a pair of compression springs 128 seated in annular grooves 130 in the containment structure. As noted, the compression springs 128 absorb the magnetic forces of repulsion applied to the first magnet member 102 as it travels to its stop position. The first magnet member 102 and the second magnet member 104 are positioned in a stable rest position in FIG. 5A with the first magnet member 102 positioned at its right stop 124 compressing the right spring 128 as shown. The second magnet member 104 is positioned at its left stop 120 with the multiple magnet assembly 113 urged against the stop by the full magnetic repulsive forces of the first multiple magnet assembly 106.

When an external force is applied to the first magnet member 102 to displace the magnet member 102 toward the left as shown in the directional arrow in FIG. 5B, the first magnet member contacts the left compression spring 128 as the zero force or neutral position is approached as shown in FIG. 5B. Once the neutral aligned position is passed, the second magnet member 104 is abruptly and forcibly urged to the right against its right stop 120 as shown in FIG. 5C. The magnetic forces applied to the first multiple magnet assembly 106 by the second multiple magnet assembly 113 cause the first magnet member 102 to be urged against its left stop 124 compressing the left compression spring 128 as shown in FIG. 5C. The positioning of the first magnet member 102 and the second magnet member 104 shown in FIG. 5C is a stable position that is the reverse of that shown in FIG. 5A.

When an external force is applied to the first magnet member 102 to urge the first magnet member 102 in the opposite direction toward the right stop 124 as shown in FIG. 5D, the second magnet member 104 remains in its position until the first magnet member 102 passes the neutral aligned position whereon the second magnet member 104 is abruptly and forcibly urged to the left stop 120 as shown in FIG. 5A which completes the cycle. As the first magnet member is displaced by the external force, it is initially assisted by the compressed compression spring 128 which expands releasing its potential energy from the previous compression thereby minimizing the amount of external force required to displace the first magnet member 102. Once the neutral aligned position is passed, the second magnet member 104 is shifted to its opposite stop, the magnetic repulsive forces urging the first magnet member 102 to its stop are resisted by the contact and compression of the opposite compression spring 128.

Figure 6:
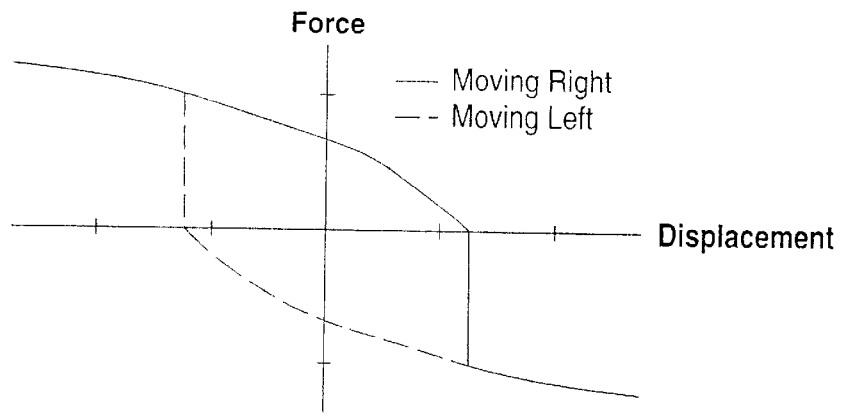
FIG. 6 is a first force vs. displacement diagram of the typical actuator mechanism.
Figure 7:
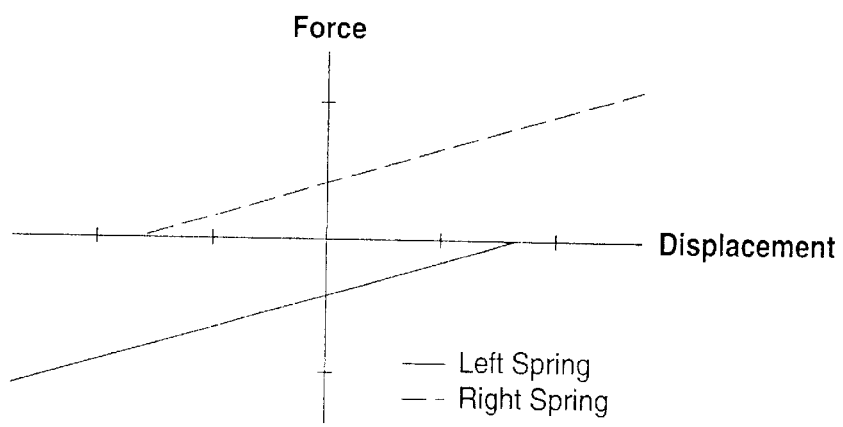
FIG. 7 is a force displacement diagram of typical compression springs.
Figure 8:
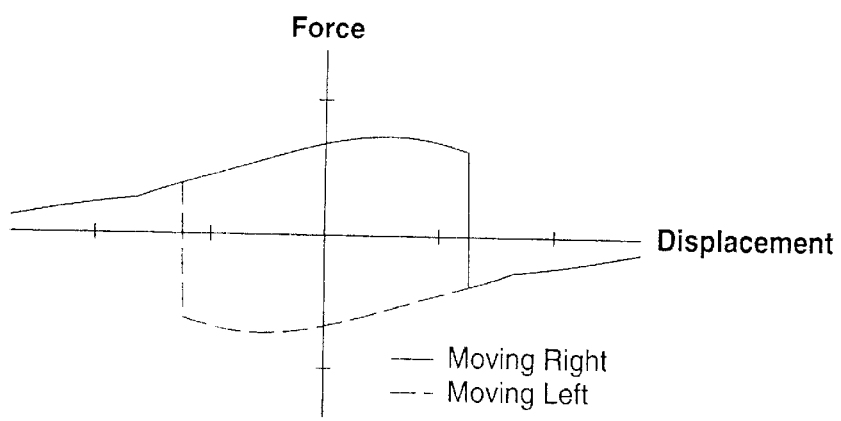
FIG. 8 is a resultant force vs. displacement diagram of the actuator mechanism including springs.

The advantage of using compression springs or some other energy recovery means is illustrated by the force vs. displacement diagrams of FIGS. 6–8.

In FIG. 6, a typical force vs. displacement diagram for applied force to a permanent magnet actuator mechanism without springs is shown. Whether the force value is negative or positive in the graph of FIG. 6 depends on the direction of travel of the primary or master element, i.e. moving right as depicted in solid line or moving left as depicted primarily in broken line.

Starting with the master element 102 at the left hand stop 124 as in FIG. 5C the force on the master element 102 by the slave element 104 is initially large and positive (e.g., rightward). As the master element moves to the right, the force becomes less positive and eventually reaches zero. The slave element 104 subsequently switches position and the force abruptly becomes negative, as indicated by the solid vertical line. As the master element 102 subsequently moves to the right, the force exerted is further negative as shown by the end of the solid line in FIG. 6. The force exhibits hysteresis due to the switched position of the slave element 104.

At the right hand stop the master element experiences a large negative (e.g., rightward) force as it moves left. The master element consequently travels further to the left before equilibrium is reached, i.e., where the force goes to zero. The force subsequently becomes abruptly positive, as indicated by the dashed vertical line, and the slave element switches position again. It is to be noted that the foregoing description relates to the scalar forces depicted in FIG. 6 and not the actual forces applied to the master element which are positive, resisting movement, at the initiation of displacement and negative, aiding movement, toward the end of displacement.

Because of the proximity of the magnets in the master and slave elements at the start of switching, the switching forces can be quite large. In order to reduce the switching forces, compression springs 128 are used. FIG. 7 depicts plots of force versus displacement for the left and right hand springs 128. By way of example, and without loss of generality, the springs exhibit substantially linear behavior. The left hand spring exerts a negative (e.g., rightward) force that decreases as the master element moves to the right, as indicated by the solid line in FIG. 7. The right hand spring exerts a positive (e.g., leftward) force resisting displacement that increases as the master element moves to the right and compresses the spring. When the effect of the springs 128 is added to the force curve due to the magnets the superposition of the two forces produces a force plot like the one shown in FIG. 8. The force curves for rightward (solid) and leftward (dashed) travel of the master element show that the initial forces are much smaller with the springs than without the springs. The forces build up gradually to the switching points indicated by the vertical solid and dashed lines. Then, instead of resisting displacement, displacement is assisted to the stop position where the master element is retained in position by the magnetic forces of the switched slave element.

The multiple magnet actuating mechanism 100 of FIGS. 5A–5D is both linearly symmetrical and axially uniform. The basic structure is particularly useful for displacement of a displaceable slave magnet member that is isolated from the master magnet member. An ideal application is the isolated spool valve as shown with reference to FIGS. 9 and 10.

Figure 9:
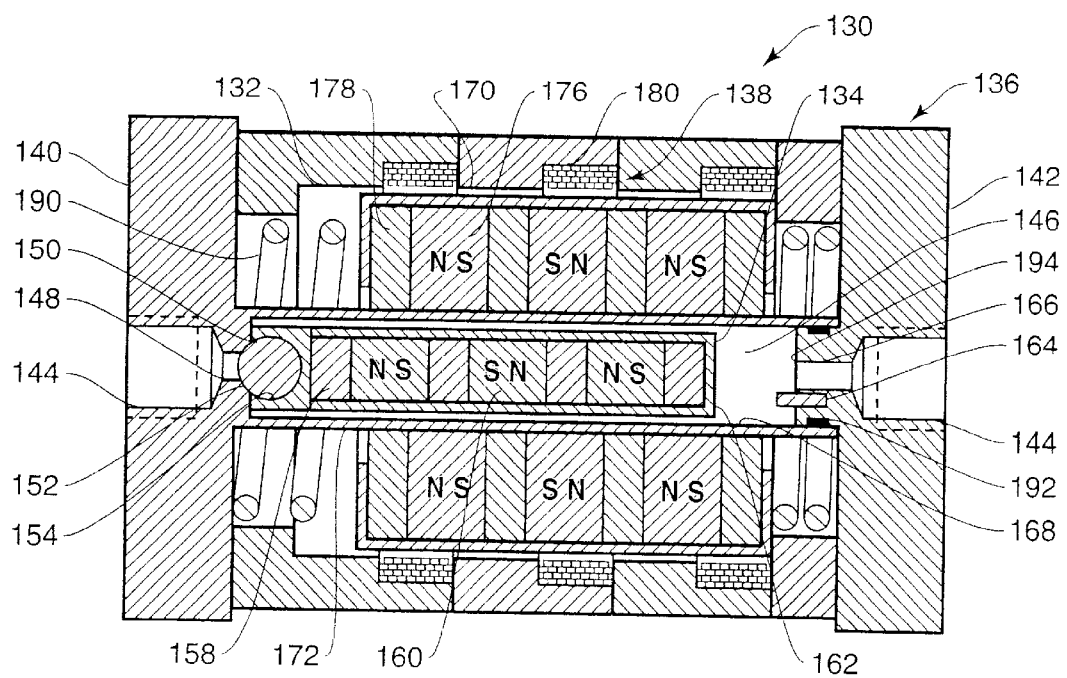
FIG. 9 is a cross-sectional view of the actuator mechanism in the application of a valve with the valve member in a closed position.
Figure 10:
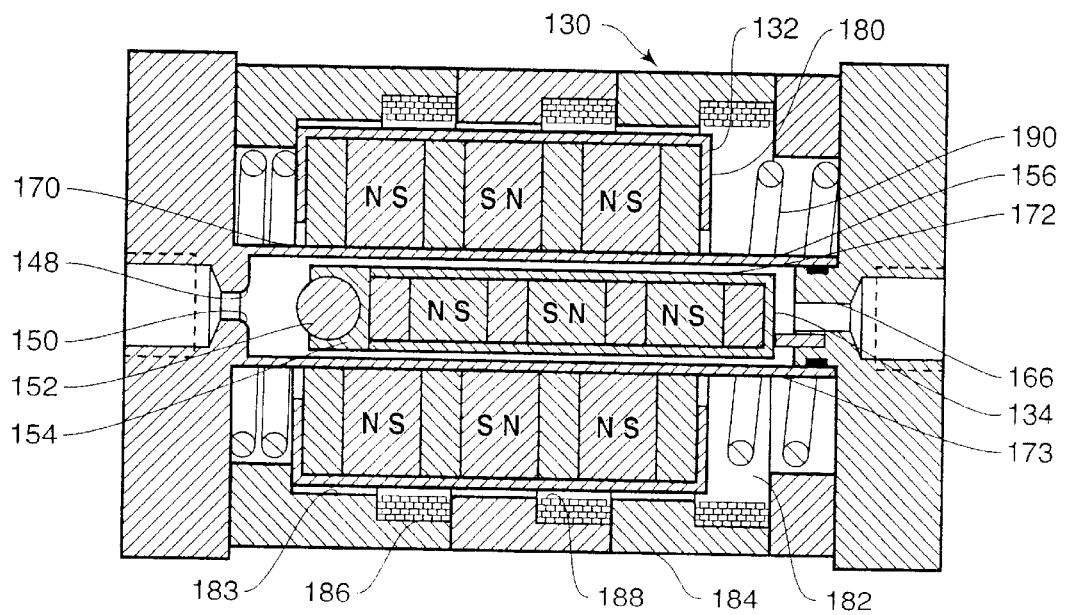
FIG. 10 is a cross-sectional view of the actuator mechanism of FIG. 9 with the valve member in an open position.
Figure 11:
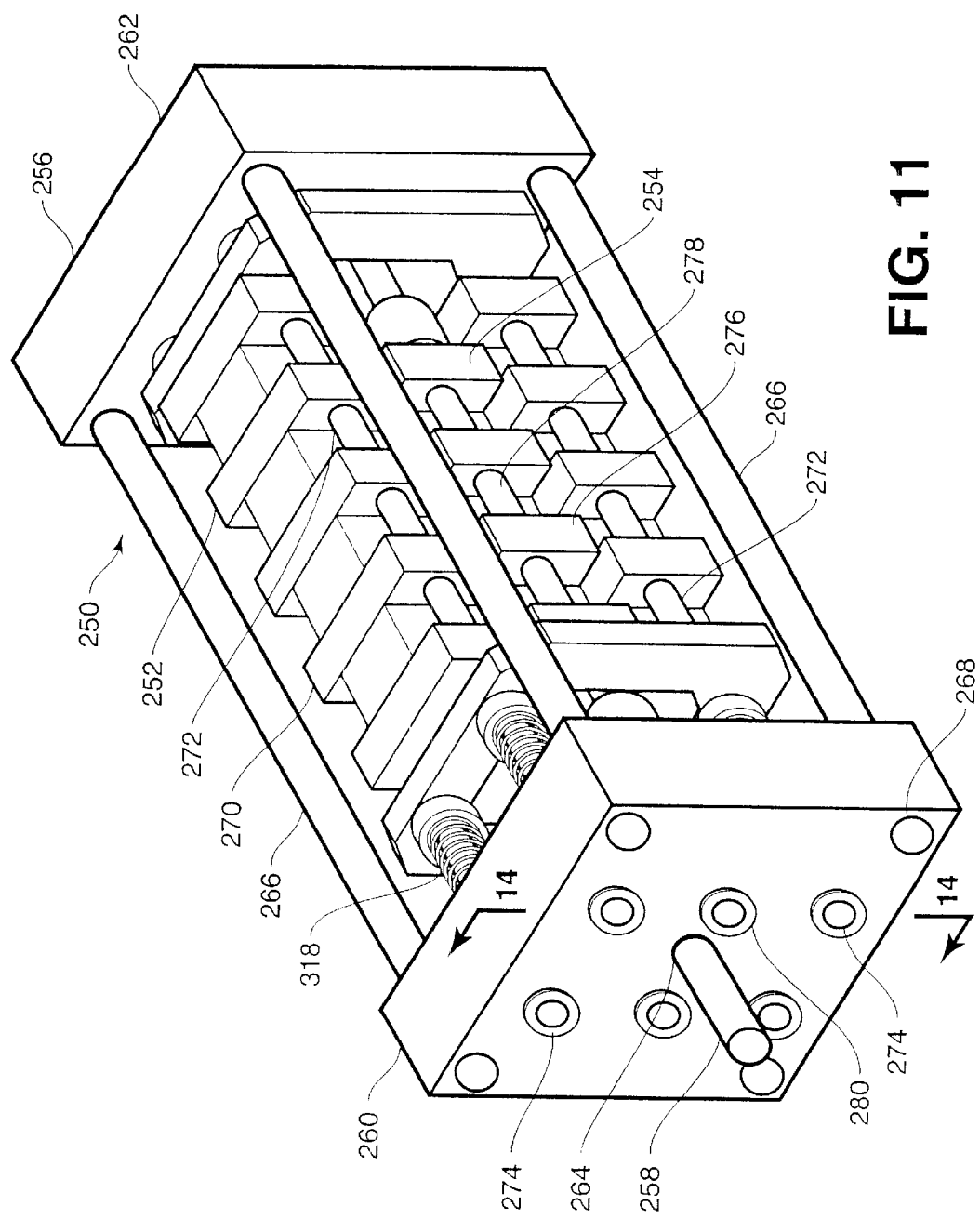
FIG. 11 is a further embodiment of the actuator mechanism of this invention in the application of a displacement device.

Referring now to FIGS. 9 and 10, a cross-sectional view of a multiple magnet actuating mechanism 130 is shown in the form of a spool valve in a closed and open position, respectively. The multiple magnet actuating mechanism 130 is a bistable device and includes a prime mover in the form of an electromagnetic coil system as an integral component of the unit.

The multiple magnet actuator mechanism 130 of FIGS. 9 and 10 has a construction similar to the multiple magnet actuating mechanism 100 shown in FIGS. 5A–5D. A first permanent magnet member 132 acts as the master member and a second permanent magnet member 134 acts as the actuated slave member. The two permanent magnet members 132 and 134 are slidable within a framework in the form of a containment structure 136. The containment structure 136 also houses an electromagnetic coil system 138 as the prime mover for displacement of the first magnet member 132 which results in the automatic reverse displacement of the second magnet member 134.

The containment structure 136 includes end blocks 140 and 142 having tapped ports 144 for typical high pressure fluid fittings (not shown). An inner chamber 146 provides a passage between the ports 144 for fluid flow when an internal aperture 148 having a valve seat 150 is not blocked by a sealing ball 152. The displaceable second permanent magnet member 134 is constructed as a valve spool with the sealing ball 152 fixed in a socket 154 at the end of an elongated multiple permanent magnet assembly 156. The multiple magnet assembly 156 includes alternating disk pole piece elements 158 and interposed permanent disk magnet elements 160 within a casing 162. The encased magnet assembly 156 is displaceable between the valve seat 150, wherein the ball 152 contacts the seat and blocks flow, and a stop pin 164 which prevents the casing 162 from blocking an internal aperture 166 at the opposite end of the chamber 146 from the ball seat 150. Fluid flow in one case is from aperture 166 around the multiple magnet spool assembly 156 to the aperture 148. Fluid flow can be in the opposite direction. In either case the use of a free floating valve spool is particularly significant for fluid measuring devices, since the effective volume of the valve chamber doesn't change on displacements of the spool.

The wall 168 of the chamber 146 is formed by a cylindrical sleeve 170 projecting from the end block 140. To allow for fluid flow, the cylindrical sleeve 170 has an inside diameter slightly greater than the diameter of the multiple magnet spool assembly 156, which floats in axial alignment within the cylindrical sleeve 170. The outer surface 172 of the cylindrical sleeve 170 provides a slide surface for the first permanent magnet member 132.

The first permanent magnet member 132 has a permanent magnet assembly 174 constructed with a series of permanent magnet elements 176 and pole piece elements 178 each having a ring-like configuration and forming an annulus with an outer shell 180. The polarity and arrangement of the magnet elements 176 and pole piece elements 178 of the first magnet member 130 are similarly arranged to the magnet elements 160 and pole piece elements 158 of the second magnet member to achieve the magnetic repulsion required. It is to be understood that polarity conditions and magnet sizes and arrangements can be varied to optimize operational requirements according to the particular application. The arrangement shown is simply one of innumerable configurations.

The permanent magnet assembly 174 is contained within an annular chamber 182 defined by the outer surface 172 of the cylindrical sleeve 170 and an inner wall 183 of a cylindrical casing unit 184 interconnecting the two end blocks 140 and 142. The casing unit 184 is segmented for inclusion of three electro-magnetic coils 186 forming the electromagnetic coil system 138 that, on activation, actuates the displacement of the first magnet member 132 and results in the opposite displacement of the second magnet member 134. As shown, a narrow air gap 188 separates the inner wall 183 of the casing unit 184 from the shell 180 of the permanent magnet assembly 174 of the first permanent magnet member 132.

Retained with the structure of the segmented casing unit 184 are compression springs 190 which operate to reduce the load requirements of the coils 186 when operating as the prime mover, as previously described. The structure forming the multiple magnet actuator mechanism 130 after assembly is sealed by an O-ring 192 on a boss 194 on the end block 142. Again, depending on the operational requirements of a particular application, the springs can be varied in spring constant or selectively omitted to vary the performance characteristics of the actuator mechanism.

Where a permanent magnet actuator mechanism is required to maximize forced mechanical displacement at minimal costs, rectangular magnet configurations are generally preferred. The preferred rectangular constructions incorporate permanent magnet assemblies that may be similar across a central axial plane, but do not have the radial uniformity of the concentric structures in FIGS. 1–4, 5A–5D and 9–10.

Referring now to FIGS. 11–14, a further embodiment of a multiple magnet actuator mechanism 250 is shown that is designed for high force systems in an application where an output in the form of a mechanical displacement is typically desired. This has particular application in latching systems, reciprocal compressors or engines, and other devices where force and stroke are desired to be optimized for a given application. In the perspective view of FIG. 11, the multiple magnet actuator mechanism 250 has a rectangular box-like configuration with a first magnet member 252 and a second magnet member 254 in a frame or containment structure 256. The second magnet member 254 is the slave member and has a connected output rod 258. The output rod 258 projects from the containment structure 256 and is reciprocal along its longitudinal axis. The output rod 258 can be connected to or comprise a piston for a compressor or engine, or alternately, can engage a strike plate for a latch or clamp.

Figure 12:
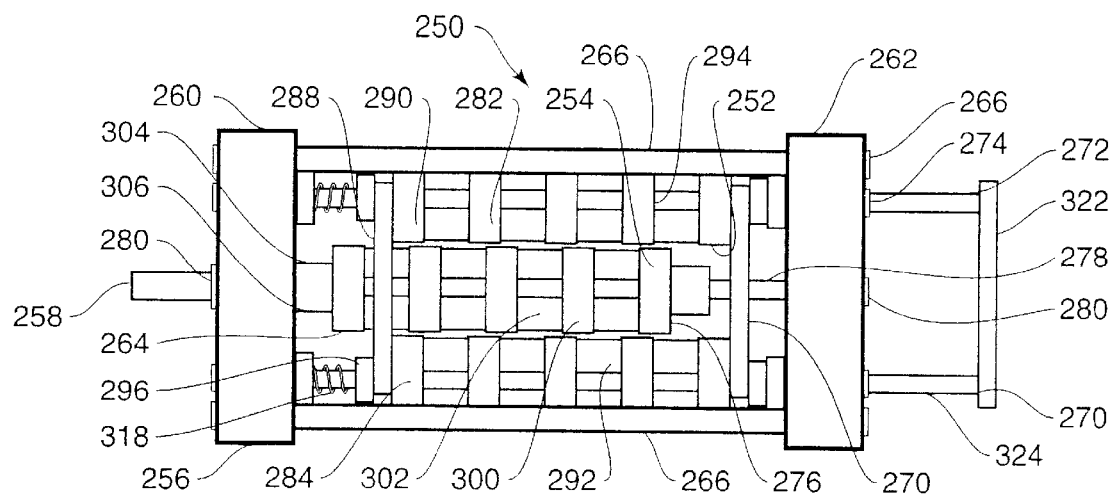
FIG. 12 is a side elevational view of the actuator mechanism of FIG. 11.
Figure 13:
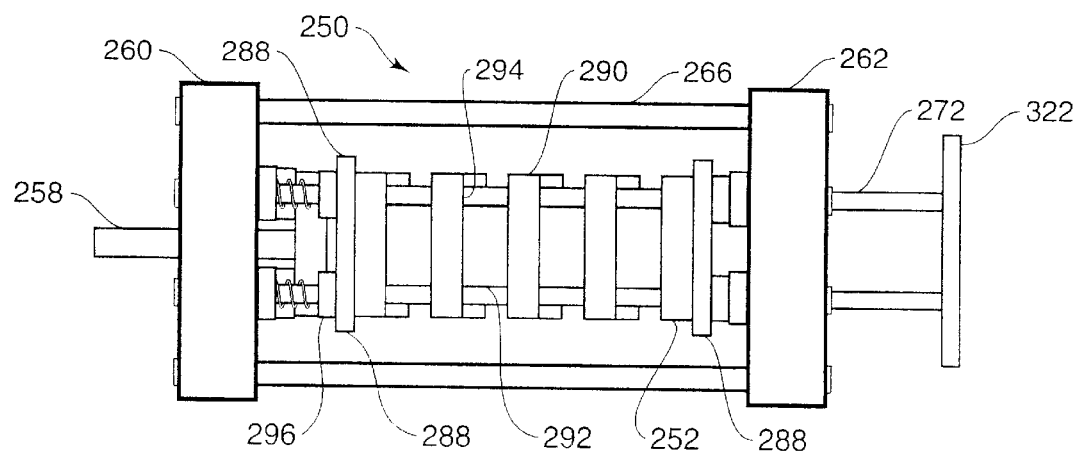
FIG. 13 is a top view of the actuator mechanism of FIG. 11.

The containment structure 256 includes opposite end blocks 260 and 262 which are identical except for the guide hole 264 through the end block 260. The end blocks 260 and 262 are interconnected by elongated bracing rods 266 fixed in the corner of each end block 262 and 264. The bracing rods 266 can be secured in holes 268 by threading, soldering, brazing or cold forming. The permanent magnet element of the first magnet member 252, shown also in the elevational views of FIGS. 12 and 13, is a multiple permanent magnet assembly 270 that reciprocates as a unit on four assembly rods 272 that reciprocate in guide bushings 274 in the end blocks. Similarly, the permanent magnet element of the second magnet member 254 is a multiple permanent magnet assembly 276 that reciprocates on two assembly rods 278 that ride in guide bushings 280 and is oppositely displaced on displacement of the first magnet member 252.

The multiple permanent magnet assembly 270 of the first magnet member 252 is constructed with two multiple magnet subunits 282 and 284 that are interconnected by end frames 288, such that the multiple magnet subunits 282 and 284 are arranged on each side of the multiple permanent magnet assembly 276 of the second magnet member 254 and act together as a tandem displacement unit. The end frames 288 each have an opening (not visible) through which the multiple magnet assembly 276 of the second magnet member 254 can travel when actuated by the oppositely diverted travel of the two multiple magnet subunits 282 and 284 of the magnet assembly 270 of the first magnet member 252.

Each of the multiple magnet subunits 282 and 284 are formed with a series of pole piece elements 290 and alternating permanent magnet elements 292. In each subunit the pole piece elements 290 bracket the rectangular magnet elements 292 and span a pair of assembly rods 272. Holes 294 in the longer pole piece elements 290 and end frames 288 allow the shorter magnet elements 292 to be clamped together with the pole piece elements 290 by nuts 296 on threaded portions 298 of the assembly rods 272 that seat against the end frames 288 as shown in the partial cross-sectional view of FIG. 14.

In a similar manner, the multiple permanent magnet assembly 276 of the second magnet member 254 is constructed with a series of pole piece elements 300 and permanent magnet elements 302 sandwiched therebetween. The outer pole piece elements 300a function as end brackets for seating nuts 304 on threaded portions 306 of the spaced assembly rods 278 of the magnet assembly 276. The two multiple magnet subunits 282 and 284 are adjusted for proximate positioning of machined faces 308 of the pole piece elements 290 with opposite machined faces 310 of the pole piece element 300 of the magnet assembly 276 of the second magnet member 254 creating a narrow air gap 312. In this manner, tolerances can be maintained by the easily machined and drilled pole piece elements, usually steel, allowing stock rectangular permanent magnet elements to be used without machining or drilling.

Figure 14:
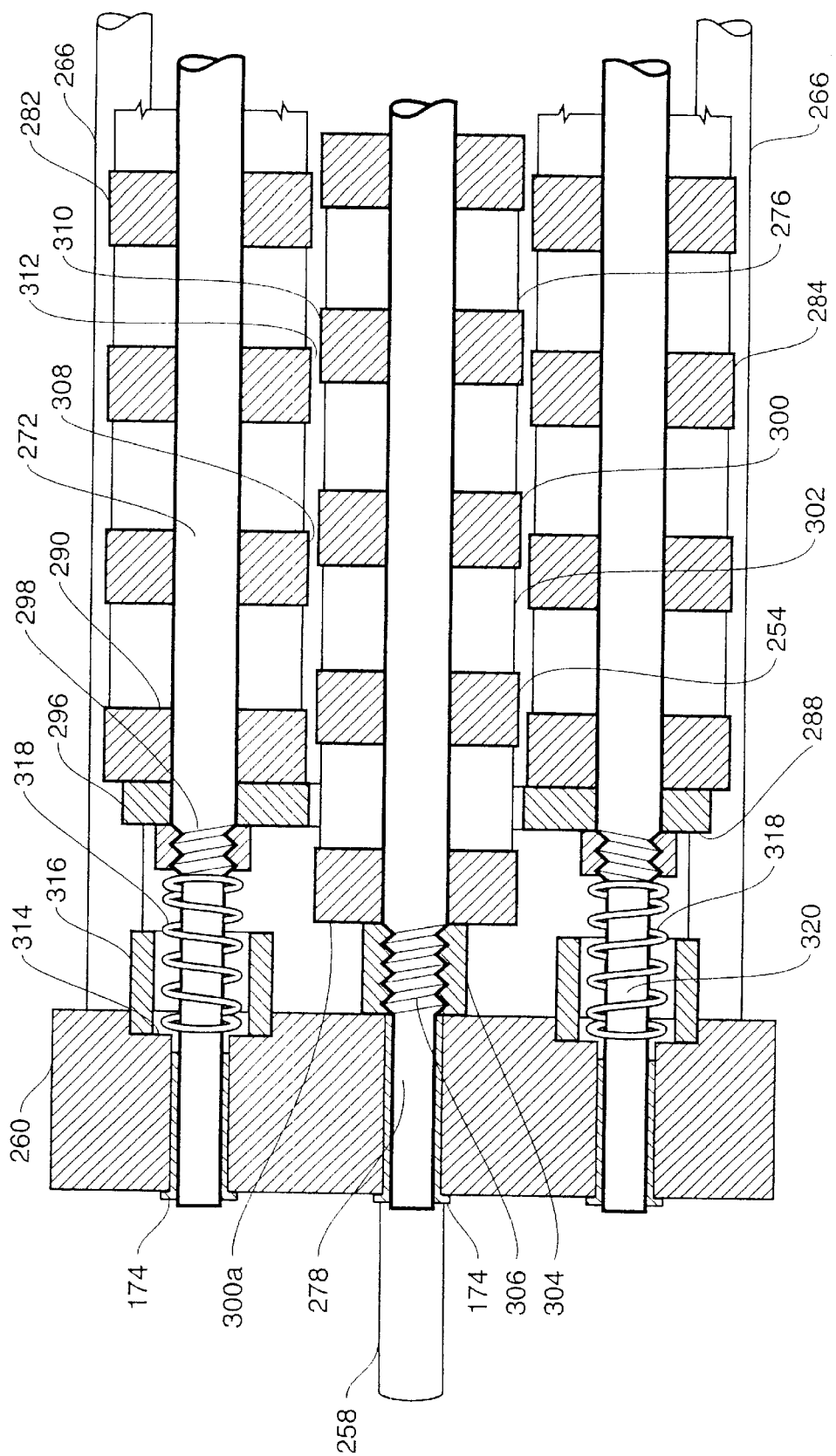
FIG. 14 is an enlarged cross-sectional view of the part of the actuator mechanism of FIG. 11 taken on the lines 14—14 in FIG. 11.

Referring to the partial cross-sectional view of FIG. 14, the end block 260 has a pair of wells 314 for seating spring retainers 316 for compression springs 318 seated in the wells around the assembly rods 272 for the two subunits 282 and 284 of the tandem displacement unit. The clamping nuts 296 also function as contact stops for contacting and compressing the springs 318 when the first magnet member is displaced toward the end block 260. The opposite end block 262 has a similar construction with compression springs 318 and retainers 316 providing an identical capture of magnetic displacement forces in the compressed springs during reciprocal displacements of the first permanent magnet member. The clamping nuts 304 of the multiple permanent magnet assembly 276 are elongated and sized to function as limit stops for the second permanent magnet member 254 when displaced. The guide bushings 274 are preferably bronze or brass to provide a guide for the necked-down segments 320 of the sliding assembly rods 272 and 278.

Actuation of the multiple magnet actuator mechanism 250 is accomplished by any of a variety of means appropriate for the application. In FIG. 12, a contact plate 322 is fixed to the projecting ends 324 of the assembly rods 272 of the first magnet member 252 acting as the master member. The contact plate 322 is useable with an external reciprocation system of conventional design.

It is to be understood that the unit of FIGS. 12–14 with a single output rod 258 can be modified to include an opposite output rod through the opposite end block 262. For example, rods of different diameter can be used as pistons in a two-stage gas compressor. The mechanism of FIGS. 12–14 has great advantage when applied as a compressor (or expander) including the following:

1. Mechanical action can be transmitted through a wall of a pressure vessel via magnetic coupling which means no seal are needed and no leaks to the outside can occur.
2. Because of the magnetic coupling, the plunger is naturally compliant and can extend to a mechanical hard stop at the end of the compression vessel yielding extremely high compression ratios.
3. Because of new magnetic materials, extremely high forces in a compact package are possible.
4. Force versus travel for the plunger matches the requirement for compression of a gas very well. The mechanism can transform a linear drive force into a non-linear resultant force. It is this force versus distance transformation that could lead to very high efficiencies.
5. The mechanism is naturally bi-directional which allows compression on both the forward and reverse stroke, doubling output over traditional piston compressors.
6. Ability to gear the outer drive travel and inner plunger travel to allow for lower force longer distance drive.
7. Generally mechanism is self centering yield low forces that are off the axial direction which allows simple low friction guiding and sealing.
8. The drive coils, if used, are on the outside of the mechanism where they can be cooled and are not limited by size. This also greatly reduces the transfer of drive heat into the working fluid. The outside drive coils are easily cooled and the motion of the outer assembly could be used to drive air over cooling fins.
9. Magnetic profiles can be used to greatly reduce required drive force compared to holding force for non work machines and change driving force to specific profiles for other work type applications.
10. Linear motion is excellent to use for low vibration compressors and can probably be coupled with resonance operating modes for some applications.
11. Mechanism is naturally bistable which results in the plunger always stopping at one end or the other. No worries about stopping at top dead center.
12. The mechanism can be made to be "on demand" and actuate back and forth only when additional compression is needed. Essentially the mechanism is naturally infinitely variable in speed.
13. No oil would be necessary so compressor can be used in "clean" applications such as dental, semiconductor and other types of operations.
14. Mechanism can be low in vibration, where vibration is not desired.
15. Mechanism can be relatively quiet.
16. Mechanism can be relatively fast in terms of actuation.
17. There are not any "flexing" parts like in a diaphragm compressor.
18. The drive controls can be extremely simple. Line drive with single triac and use positive and negative voltage cycles to drive one direction and the other. If need full speed all the time just connect to the AC line at 50 or 60 cycles per second.
19. Travel sensors can be placed on the slider assembly so that the drive power can be switched off as soon as is passes the magnetic center line which assures completion of travel. This can save electrical power and greatly reduce waste heat like builds up in solenoid designs.
20. Electrically operated with no large startup inrush current surge.
21. Design can be done so that if inner plunger is not able to move then the outer slider will not complete its travel giving a positive indication that the inner plunger is stuck.
22. The design can be turned inside out and the plunger can be driven and the slider can be the device that is moved. This might be useful when the drive elements need to be isolated from some hostile environment such as undersea or explosive atmosphere.

Additionally, changes in the magnet structure or relative positioning of the multiple magnet assemblies as well as the use of different compression springs at each end, as noted, can alter the displacement characteristics and permit the actuator mechanism to be tailored to a particular use or application.

Figure 16:
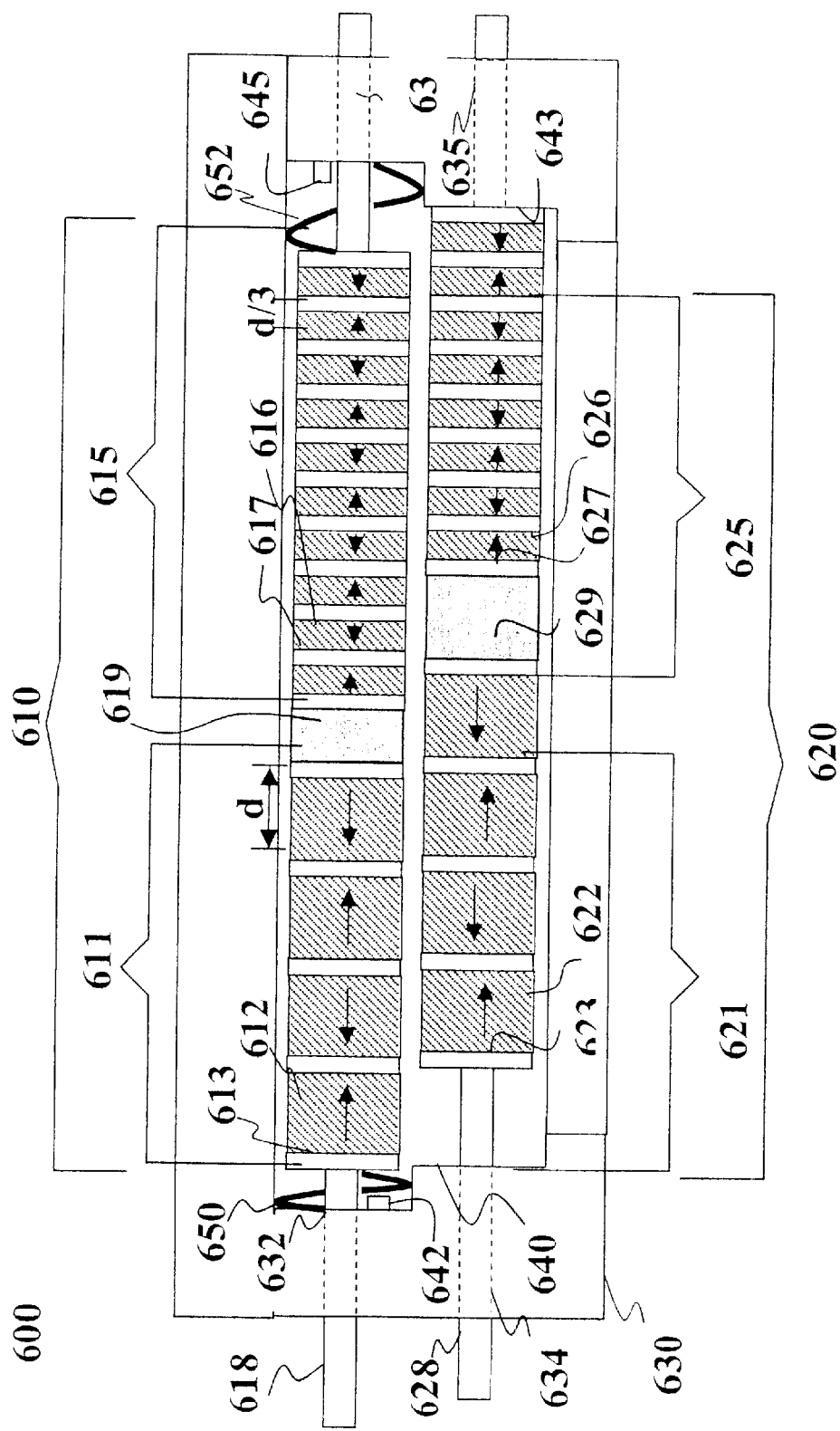
FIG. 16 depicts a magnetic actuator device according to an alternative embodiment of the invention.

Furthermore, symmetric structures, although advantageous in many circumstances, are not always required. When repulsion forces of the magnets normal to the axes of displacement of the first and second permanent magnet members can be contained by the containment structure, radial or planar symmetry is not necessary as shown in the schematic of FIG. 16, described hereinafter. Although primarily illustrated to exemplify a unique multiple magnet configuration for developing a flattened force of displacement curve, the device in FIG. 16 depicts the use of face-to-face magnet assemblies for first and second magnet members. Such an arrangement may be useful where the space for the height of magnet assemblies is limited and repulsive forces normal to travel are controlled by the containment structure to maintain the desired proximity for an optimized air gap between magnet assemblies.

However, before moving to the complex mechanism of FIG. 16 further analysis of the typical basic system is helpful.

The operation of the actuation devices described above is best understood by reference to force and potential energy versus displacement curves. For example, FIGS. 15A–15B respectively depict normalized graphs of force and potential energy versus relative displacement of the master and slave elements for a device of the type described above. Because of Newton's third law, the force graph of FIG. 15A can be interpreted either as the force exerted by the master element on the slave element or vice versa. The displacement is a relative displacement of the master and slave elements with respect to each other. In a like manner, the potential energy graph of FIG. 15B may be regarded as depicting the potential energy of the system due to the relative positions of the magnets in the master and slave elements. By way of example the graph in FIG. 15A refers to forces exerted on a fixed slave element by the magnets in the master element as the master element moves from left to right past the slave element.

Figure 15A:
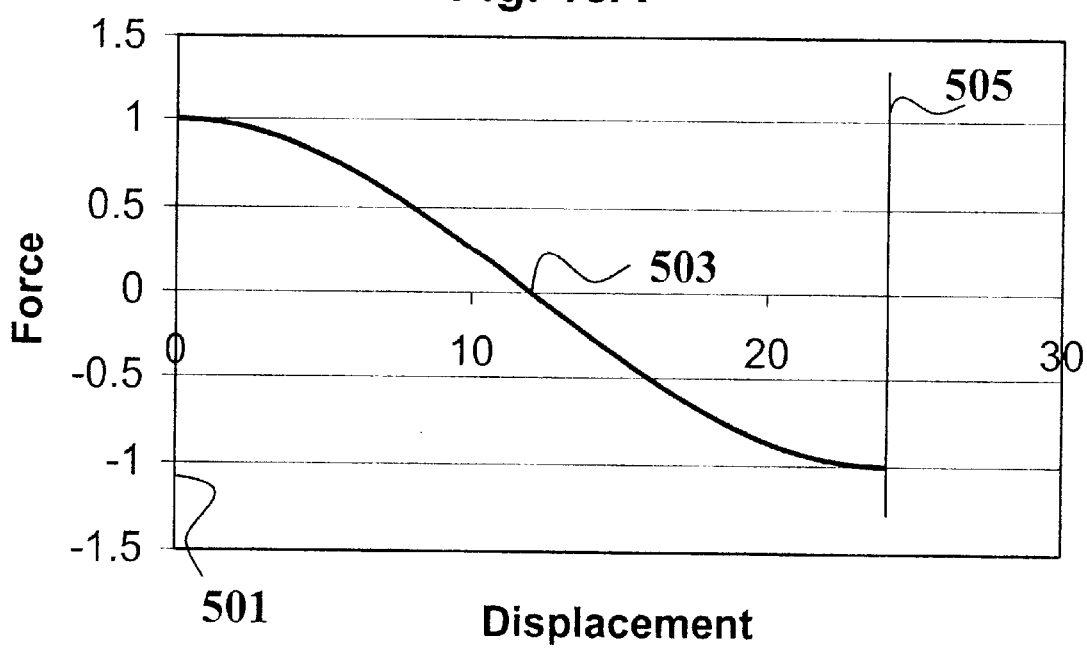
FIGS. 15A–15B depict graphs of force and potential energy versus relative displacement of the inner and outer elements for an actuator device according to an embodiment of the present invention.
Figure 15B:
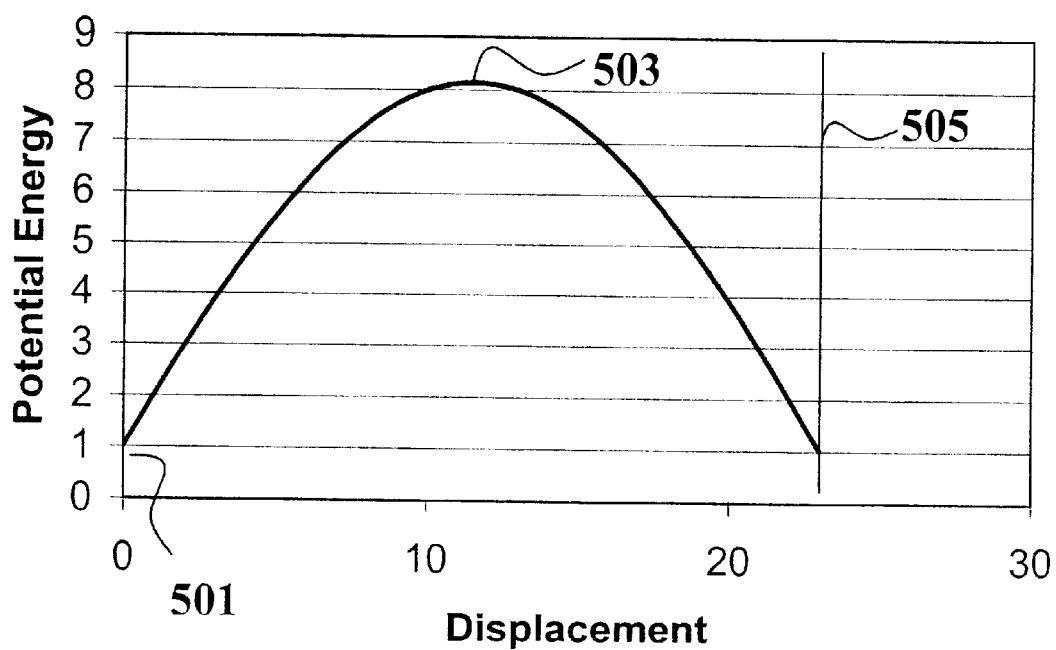

Beginning with the vertical line 501 at the extreme left end of the graph, the master element is held against the left stop. A large force is exerted on the slave element towards the right, which is taken by convention to be the positive direction. This force is counter balanced, by an equal and opposite force exerted by the stop holding the slave in a fixed position. As the master element moves to the right, the force decreases in a substantially sinusoidal fashion. Although the force decreases, the potential energy increases because the magnets are being pushed closer together. At an equilibrium point 503, where the magnetic center line of the master element is aligned with the slave, the force goes to zero. Note that the potential energy graph has a downward curvature, which indicates that this equilibrium point is unstable, i.e., a small push either to the left or right will tend to drive the master and slave elements away from each other. As the master element continues to move to the right past the equilibrium point 503 the direction of the force changes from right to left (the negative direction) and the slave element wants to move to the left. The force on the slave element increases in magnitude and, if the slave element were free to move, eventually pushes the slave element against the left end stop, as indicated by the vertical line 505. It is often desirable to flatten out the force versus displacement curve in the vicinity of the equilibrium in order to smooth out the force required for the resulting actuation, i.e., the force required to move the master element. One way to accomplish this is by using the principle of Fourier analysis. In essence, the force curve depicted in FIG. 15A is a sinusoid having a period determined by the thickness of the magnets in the inner and outer elements. The shape of the sinusoid may be modified by combining it with a sinusoid having a different period. In principle, what is desired is to provide counter-forces in the vicinity of the equilibrium that tend to cancel out the forces due to the magnets. Such counter-forces may be provided, for example, by a secondary set of magnets spaced apart by a different distance than that of the primary set of magnets. Using the principles of Fourier analysis, it can be shown that the force curve may be flattened in the vicinity of the equilibrium if the secondary magnets are sized at about one third the thickness of the primary magnets. The amount of flattening may then be adjusted by changing the relative strengths and phasing of the primary and secondary magnets.

An actuator device 600 according to an alternative embodiment of the invention is shown in the simplified cross-sectional schematic diagram of FIG. 16. The actuator device 600 generally comprises a master element 610, a slave element 620, and a frame 630 having end stops 640, 642, 643, 645. The master and slave elements 610, 620 contain primary and secondary stacks of magnets that produce opposing forces. Shafts 618, 628 are attached to the master and slave elements 610 and 620 respectively. The shafts 618, 628 are slidably received in bores 632, 633, 634, 635 in the frame 630. The shafts 618, 628 and frame 630 restrict the motion of the elements 610, 620 to axial motion. The end stops 640, 642, 643, 645 restrict the range of the axial motion of the translating elements 610, 620. The actuator device 600 may optionally include springs 650, 652, between the ends of the master element 610 and the end stops 642, 645, to reduce the switching force on the master element as described above. The actuator device 600 may also optionally include one or more electromagnetic coils (not shown) to apply an actuating force to the master element 610 as described above with respect to FIGS. 9–10.

The master element 610 has primary and secondary stacks 611, 615 of permanent magnets 612 and 616. The magnets 612 in the primary stack are of thickness d and separated from each other by pole pieces 613. The magnets 616 in the secondary stack are of thickness approximately d/3 and separated from each other by pole pieces 617. The slave element 620 has primary and secondary stacks 621, 625 of permanent magnets 622, 626. The primary magnets 622 are of thickness d and separated from each other by pole pieces 623. The secondary magnets 626 are of thickness approximately d/3 and separated from each other by pole pieces 625. The magnets 612, 616, 622, 626 have their poles oriented as shown by the arrows. It is often desirable to displace the primary and secondary stacks so that they do not interfere with each other. To this end the primary stack 611 in the master element 610 may be separated from the secondary stack 615 by a nonmagnetic spacer 619. Similarly, the primary stack 621 in the slave element 620 may be separated from the secondary stack 625 by a nonmagnetic spacer 629.

By way of example, the relative strengths of the primary and secondary magnets may be adjusted by varying their respective material compositions. For example, neodymium magnets are commercially available in strengths ranging from 10 megagauss-oersted (MGO) to 50 MGO. Alternatively, the strengths of the primary and secondary magnets may be varied by making them of different sizes. The relative strengths of the forces produced by the primary and secondary stacks may also be adjusted by varying the numbers of magnets in the primary and secondary stacks.

Figure 17A:
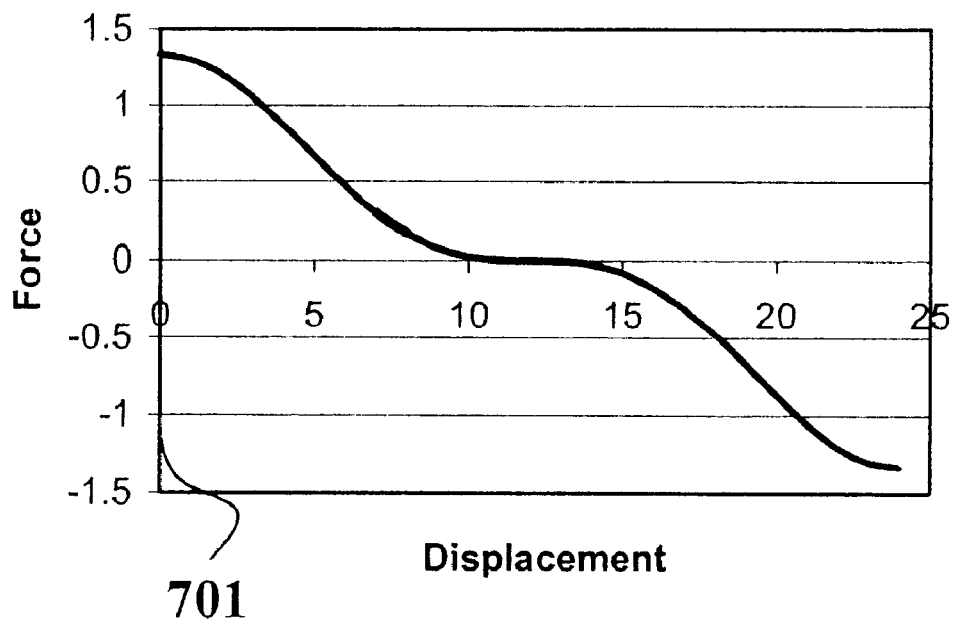
FIGS. 17A–17B depict graphs of force and potential energy versus displacement for an actuator device according to an alternative embodiment of the present invention.
Figure 17B:
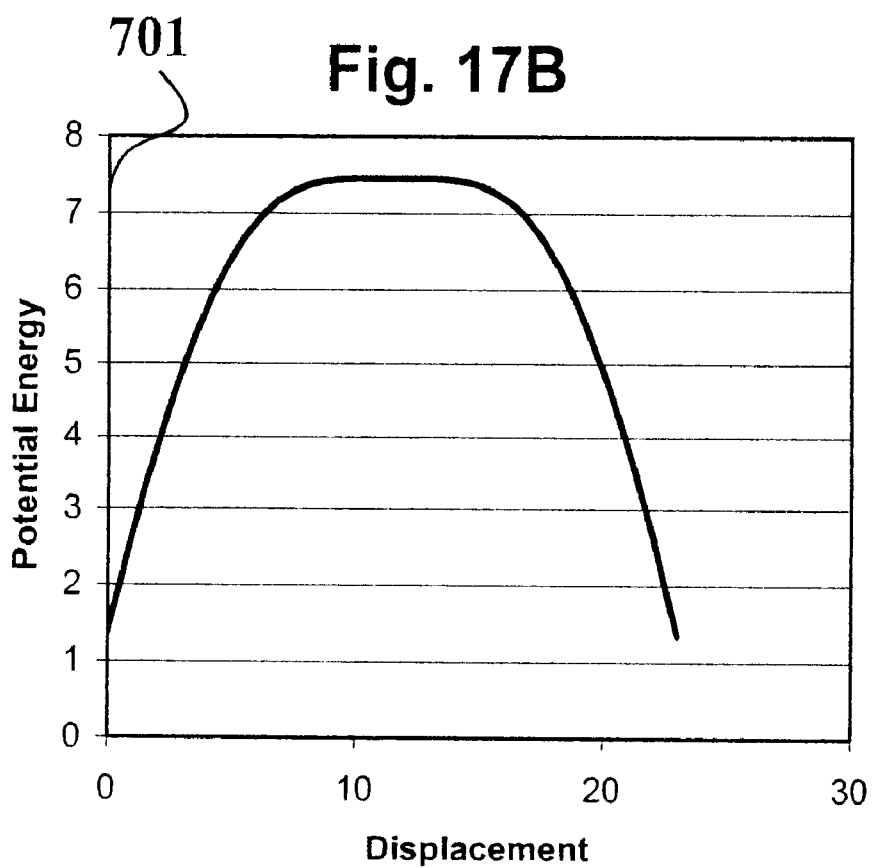

The effect of the secondary magnets depicted in FIG. 16 on the operation of the actuation devices described above is best understood by reference to force and potential energy versus displacement curves. For example, FIGS. 17A–17B respectively depict theoretical normalized graphs of force and potential energy versus relative displacement for a device of the type shown in FIG. 16. In FIG. 17A, the forces exerted by the secondary stacks of magnets 616, 626 are about one third the strength of the forces exerted by the primary magnets 612, 622. By way of example, force graph depicts forces exerted on the slave element 620 by the magnets in the master element 610 as the master element 610 moves from left to right. Beginning with the vertical line 701 at the extreme left end of the graph, the master element 610 is held against the left stop 642 and the slave element is held against the right end stop 643. A large force, directed towards the right, is exerted on the slave element 620. This force is counter balanced, by an equal and opposite force exerted towards the left by the right stop 643. As the master element 610 moves to the right, the opposing forces between the primary magnets 612, 622 decreases. The potential energy increases because the primary magnets 612, 622 are in repulsion and being pushed closer together. However, because of the different spacing between the secondary magnets 616, 626 some of the secondary magnets are in attraction. The resulting attractive force partially compensates for the larger repulsive force between the primary magnets 612, 622. Consequently, the force curve tends to flatten out as shown in FIG. 17A. The peak in the potential energy curve in FIG. 17B is also flattened.

Figure 18A:
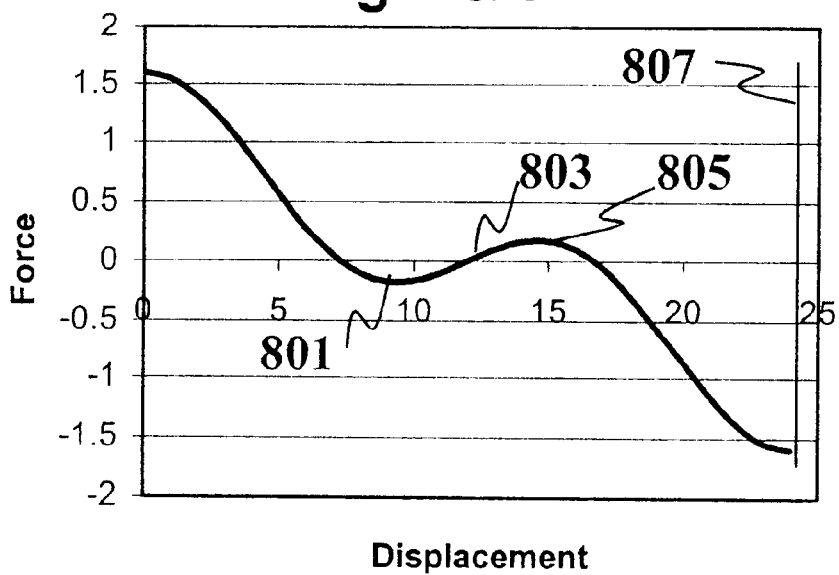
FIGS. 18A–18B depict graphs of force and potential energy versus displacement for an actuator device according to another alternative embodiment of the present invention.
Figure 18B:
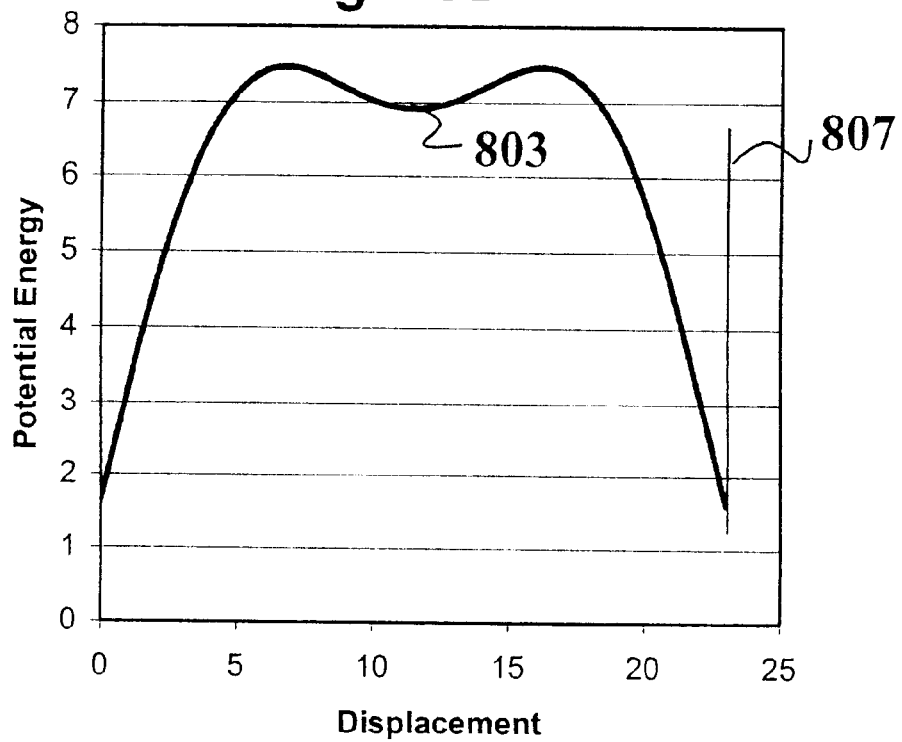

By increasing the strength of the secondary stack relative to the primary stack it is possible to counteract the forces exerted by the primary magnets to such an extent that the equilibrium becomes stable. Examples of theoretical force and potential energy curves are depicted in FIGS. 18A–18B. Here, the magnets in the secondary stacks 615, 625 exert forces that are about three-fifths the strength of the forces exerted by the magnets in the primary stacks 611, 621. An interesting feature of the Force curve is that as the master element travels to the right, the force curve rises to a finite positive value, 801, and then decreases to an equilibrium value 803, e.g., zero. The force then becomes negative up to a finite negative value at 805 before rising again until the motion of the master element is halted by the right end stop 645 as indicated by the vertical line 807. The effect is even more apparent from the potential energy curve of FIG. 8B. The potential energy curve has a slight dip in the vicinity of the equilibrium 803. This dip indicates that small deviations from the equilibrium 803 produce forces that tend to push the second element 620 back toward the equilibrium. Thus, the equilibrium 803 is stable.

It should be pointed out that magnets in repulsion typically experience some degree of demagnetization over time depending on operating conditions. The degree of demagnetization is different for different magnetic materials. Generally, the amount of demagnetization depends upon the reverse applied field and temperature. When magnets in repulsion are used to generate large forces, large reverse applied fields may act on the magnets. Permanent magnets are often characterized by a coercivity, a material property that measures the resistance of the magnet to demagnetization in a reverse applied field. Coercivity varies greatly for different magnetic materials. For example, aluminum-nickel-cobalt (AlNiCo) magnets have a relatively low coercivity and may experience almost complete demagnetization if they are placed close enough together in repulsion. By comparison, high coercivity rare earth magnets, such as neodymium magnets, samarium cobalt magnets, and the like demagnetize by only a small amount even when in repulsion in close proximity. This property makes high-coercivity rare earth magnets particularly suitable for use in actuators of the types described above. Because such magnets are often brittle, they are usually coated with a metal such as nickel, aluminum or copper, which tends to keep the magnets from breaking apart upon impact.

It is to be understood that other arrangements of magnets and pole pieces can be employed to focus or distribute magnetic forces to achieve design requirements for specific applications. Additionally, as noted, changes in the thickness of the permanent magnets can change the stroke of the actuator device. Furthermore, variations in the springs or other energy recovery means permits the force/displacement curve to be modified and optimized for a particular application. This specification is intended to describe principles of operation and the several variables that can be altered to adapt permanent magnet actuator mechanisms incorporating the invention to particular applications. While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A permanent magnet actuator mechanism comprising:
   a first magnet member having a permanent magnet element wherein the first magnet member is displaceable between a first position and second position;
   a second magnet member having a permanent magnet element wherein the second magnet member is displaceable between a first position and a second position;
   a containment structure wherein the magnet element of the first magnet member is proximately positioned to the magnet element of the second magnet member and the magnets are maintained in substantial repulsion; and, wherein displacement of one of said first and second magnet members from one of said first and second positions to the other of said first and second positions actuates the opposite displacement of the other of said first and second magnet members from the opposite one of said first and second positions to the other of said first and second positions.

2. The permanent magnet actuator mechanism of claim 1 wherein the permanent magnet element of the first magnet member is a magnet and the permanent magnet element of the second magnet member is a magnet.

3. The permanent magnet actuator mechanism of claim 1 wherein the permanent magnet element of the first magnet member is a multiple magnet assembly and the permanent magnet element of the second magnet member is a multiple magnet assembly.

4. The permanent magnet actuator mechanism of claim 1 wherein the containment structure has first and second displacement limits that limit displacements of the first magnet member to the first position and to the second position, and, has third and fourth displacement limits that limit displacements of the second magnet member to the first position and to the second position.

5. The permanent magnet actuator mechanism of claim 4 wherein the displacement limits of the containment structure comprise stops.

6. The permanent magnet actuator mechanism of claim 4 wherein the containment structure comprises a frame wherein the frame has a guide for displacements of one of the first magnet member and the second magnet member.

7. The permanent magnet actuator mechanism of claim 4 wherein the containment structure comprises a frame wherein the frame has a guide for displacements of the first magnet member and a guide for displacements of the second magnet member.

8. The permanent magnet actuator mechanism of claim 1 comprising further, a spring wherein one of the first magnet member and the second magnet member is a master member and the other of the first magnet member and the second magnet member is a slave member wherein the spring is retained by the containment structure at one of said first and second positions of the master member and limits displacement of the master member at that position.

9. The permanent magnet actuator mechanism of claim 1 comprising further, first and second springs wherein one of said first magnet member and the second magnet member is a master member and the other of the first magnet member and the second magnet member is a slave member wherein the first spring is retained by the containment structure at the first position of the master member and limits displacement of the master member at that position, and the second spring is retained by the containment structure at the second position of the master member and limits displacement of the master member at that position.

10. The permanent magnet actuator mechanism of claim 1 in combination with a prime mover device wherein one of said first magnet member and said second magnet member is a master member and the other of said first magnet member and said second magnet member is a slave member wherein the prime mover device displaces the master member in one direction which actuates displacement of the slave member in an opposite direction.

11. The permanent magnet actuator mechanism of claim 10 wherein the prime mover device comprises a mechanical actuator connected to the master member wherein mechanical displacement of the mechanical actuator results in displacement of the master member.

12. The permanent magnet actuator mechanism of claim 10 wherein the prime mover device comprises an electronic coil wherein electrical activation of the coil displaces the master member.

13. The permanent magnet actuator mechanism of claim 10 wherein the prime mover device comprises an electromagnetic driver that coacts with the permanent magnet element of the master member wherein electrical activation of the electromagnetic driver selectively displaces the master member in one of a first direction and a second direction opposite the first direction.

14. The permanent magnet actuator mechanism of claim 1 wherein the permanent magnet element of the first magnet member has an annular configuration with an axis and an axial annulus and the permanent magnet element of the second magnet member has a cylindrical configuration with an axis wherein the permanent magnet element of the second magnet member is positioned within the annulus of the permanent magnet element of the first magnet member wherein the magnet elements have a common axis.

15. The permanent magnet actuator mechanism of claim 14 wherein the containment structure has a casing separating the permanent magnet element of the second magnet member from the permanent magnet element of the first magnet member.

16. The permanent magnet actuator mechanism of claim 15 wherein the casing separating the second magnet member from the first magnet member forms a chamber with the permanent magnet element of the second magnet member being reciprocal in the chamber.

17. The permanent magnet actuator mechanism of claim 16 wherein the chamber is elongated with ends each end having an aperture wherein a passage is formed between the apertures.

18. The permanent magnet actuator mechanism of claim 17 wherein at least one aperture has a valve seat and the permanent magnet element of the second magnet member has a sealing element that is engageable with the valve seat when the second magnet member is displaced toward the aperture having the sealing element.

19. The permanent magnet actuator mechanism of claim 18 wherein the permanent magnet element of the second magnet member is elongated with ends and the sealing element is a sealing ball on one end of the elongated permanent magnet element.

20. The permanent magnet actuator mechanism of claim 17 wherein the permanent magnet element of the second magnet member is elongated with ends wherein on of the ends on displacement of the permanent magnet element selectively blocks one of the apertures.

21. A method for actuating a permanent magnetic actuator having a first translator member with a permanent magnetic element having a magnet field polarity wherein the first translator member is displaceable between a first position and a second position, and a second translator member having a permanent magnetic element with a magnet field polarity wherein the second translator member is displaceable between a first position and a second position:

limiting a displacement of said first and second translator member such that the first and second translator members are proximately positioned with the magnetic field polarity of the permanent magnetic element of the first translator element in substantial opposition to the magnetic field polarity of the magnetic element of the second translator member when said respective first and second translator members are in said respective first and second positions; and displacing one of said first and second translator members from one of said first and second positions such that a magnetic force between the permanent magnetic element of the first translator element and the magnetic element of the second translator member actuates an opposite displacement of the other of said first and second translator members from one of said first and second positions to the other of said first and second positions.

22. A permanent magnetic actuator device comprising:

a first translator member with a permanent magnetic element having a magnet field polarity wherein the first translator member is displaceable between a first position and a second position;

a second translator member having a permanent magnetic element with a magnet field polarity wherein the second translator member is displaceable between a first position and a second position;

means for limiting a displacement of said first and second translator members such that the first and second translator members are proximately positioned with the magnetic field polarity of the permanent magnetic element of the first translator element in substantial opposition to the magnetic field polarity of the magnetic element of the second translator member when said respective first and second translator members are in said respective first and second positions; and means for displacing one of said first and second translator members from one of the first and second positions such that a magnetic force between the permanent magnetic element of the first translator element and the magnetic element of the second translator member actuates an opposite displacement of the other of said first and second translator members from one of said first and second positions to the other of said first and second positions.

23. The permanent magnet device of claim 22 wherein the permanent magnet element of the first translator member comprises a set of permanent magnets and wherein the permanent magnet element of the second translator member comprises a set of permanent magnets.

24. The permanent magnet device of claim 23 wherein the sets of permanent magnets in the first translator member and the second translator member have permanent magnets separated by pole pieces.

25. The permanent magnet device of claim 23 wherein the permanent magnet element of the first translator member comprises first and second sets of permanent magnets and the permanent magnet element of the second translator member comprises first and second sets of permanent magnets wherein the permanent magnets in the first sets have a thickness, and the permanent magnets in the second sets have a thickness approximately one third the thickness of the permanent magnets in the first sets the thickness of the permanent magnets in the second sets being selected and arranged to flatten a translocation force curve when one of said first and second translator members is displaced relative to the other of said first and second translator members.

26. The permanent magnet device of claim 25 wherein the permanent magnets of the sets are separated by pole pieces and are arranged in stacks with the stacks of permanent magnets of the first translator member being arranged proximate to the permanent magnets of the second translator member.

* * * * *